(12) United States Patent
Kenkel

(10) Patent No.: US 9,611,950 B2
(45) Date of Patent: Apr. 4, 2017

(54) ELECTROHYDRAULIC VALVE CALIBRATION SYSTEM AND METHOD

(71) Applicant: DEERE & COMPANY, Moline, IL (US)

(72) Inventor: Aaron R. Kenkel, Dubuque, IA (US)

(73) Assignee: Deere & Company, Moline, IL (US)

( * ) Notice: Subject to any disclaimer, the term of this patent is extended or adjusted under 35 U.S.C. 154(b) by 114 days.

(21) Appl. No.: 14/676,387

(22) Filed: Apr. 1, 2015

(65) Prior Publication Data

US 2016/0290523 A1    Oct. 6, 2016

(51) Int. Cl.
| | | |
|---|---|---|
| F15B 19/00 | (2006.01) | |
| F16K 31/02 | (2006.01) | |
| F15B 1/00 | (2006.01) | |
| F16K 37/00 | (2006.01) | |
| F16K 31/06 | (2006.01) | |

(52) U.S. Cl.
CPC ............ *F16K 31/02* (2013.01); *F15B 1/00* (2013.01); *F16K 31/0613* (2013.01); *F16K 37/0091* (2013.01)

(58) Field of Classification Search
CPC .. F16K 37/0091; F16K 37/0083; F16K 17/06; F15B 19/002; F15B 13/0442; Y10T 137/86027; G05B 13/041; G05B 13/021; G05D 7/0635; G01L 25/00
USPC ............... 137/565.16; 700/282; 91/459, 469; 73/1.72
See application file for complete search history.

(56) References Cited

U.S. PATENT DOCUMENTS

| | | | | |
|---|---|---|---|---|
| 4,563,939 | A | * | 1/1986 | Siegrist .................. B22D 17/32 137/596.17 |
| 5,623,093 | A | * | 4/1997 | Schenkel .............. E02F 9/2025 73/1.01 |
| 5,762,475 | A | | 6/1998 | Maddock et al. |
| 6,341,552 | B1 | * | 1/2002 | Potter ................... F15B 19/002 91/433 |
| 6,397,655 | B1 | * | 6/2002 | Stephenson ........... F15B 19/002 73/1.72 |
| 6,571,190 | B2 | | 5/2003 | Hou et al. |
| 7,512,460 | B2 | * | 3/2009 | Strosser ................ F15B 19/002 700/282 |

(Continued)

*Primary Examiner* — Matthew W Jellett
(74) *Attorney, Agent, or Firm* — Taft Stettinius & Hollister LLP; Stephen F. Rost

(57) ABSTRACT

A valve calibration system and method is disclosed for an electrohydraulic valve having upstream and downstream sides. A valve current controls the valve orifice size connecting the upstream and downstream sides. The calibration method includes opening the valve, stalling the system to prevent volume changes, and closing the valve with substantially equalized upstream and downstream pressures; then increasing upstream pressure, and finding a calibration current that provides a calibration orifice size through the valve by monitoring downstream pressure. Finding a calibration current can include stepping through valve control currents, sensing downstream pressures, and calculating step orifice sizes until the calculated step orifice size is greater than or equal to the calibration orifice size. Finding a calibration current can include performing a coarse calibration followed by a finer calibration. An offset can be calculated for a valve characteristic relating valve control current to valve orifice size.

20 Claims, 2 Drawing Sheets

(56) References Cited

U.S. PATENT DOCUMENTS

| | | | | |
|---|---|---|---|---|
| 7,562,554 B2* | 7/2009 | Yoo | ............... | E02F 9/2221 |
| | | | | 73/1.72 |
| 7,997,117 B2* | 8/2011 | Zhang | ............... | G01F 15/005 |
| | | | | 73/1.79 |
| 8,061,180 B2 | 11/2011 | Green | | |
| 8,347,686 B2* | 1/2013 | Joseph | ............... | B29C 47/92 |
| | | | | 73/1.72 |

* cited by examiner

ELECTROHYDRAULIC VALVE CALIBRATION SYSTEM AND METHOD

FIELD OF THE DISCLOSURE

The present disclosure relates to the calibration of an electrohydraulic valve, and more particularly to calibration of a valve control current controlling an orifice size through an electrohydraulic valve.

BACKGROUND

In an electrohydraulic (EH) system, an electronically controlled valve is typically designed to have a certain current control characteristic. In other words, the current that is driven to the valve control solenoid will either directly or indirectly displace the valve spool. The spool may require a certain minimum amount of displacement before it enters its metering range, which is the range at which fluid starts to flow across the valve. This spool displacement, and the current required to get this displacement, are often designed to occur at a specific point. However, due to manufacturing tolerances, the imprecision of this "start of flow" or "cracking" point may not be adequate for a particular application.

The area of the opening or orifice allowing the flow of fluid through an electrohydraulic valve is controlled by a valve current. An electrohydraulic valve has a current dependent metering range between a cracking current and a saturation current. The cracking current is the valve current value at which the valve orifice is very slightly open allowing a very small flow of fluid through the valve. The saturation current is the valve current value at which the valve orifice is fully open allowing the maximum flow of fluid through the valve. The valve current control characteristic relating valve current to valve orifice size over the metering range is usually well characterized. A supplier valve current control characteristic is typically provided with a valve by the supplier. The supplier valve current control characteristic is usually accurate in shape but often needs to be offset to account for variances between valves, for example manufacturing variations, machining tolerances, etc., and impacts of valve environments.

A valve calibration routine can be implemented to estimate a start of flow point or cracking point to use as an offset for the supplier valve current control characteristic. One method involves a system with a load sensing hydraulic pump where the valve start of flow point can be determined by observing the pump output pressure while the hydraulic function downstream of the valve is in a stalled condition. In this scenario, the cracking of the valve induces a load sense signal that drives the pump up to pressure. However, this method cannot be used for calibration in an electrohydraulic system using a pump with an electronically controlled displacement. The cracking point and cracking current to produce this "start of flow" point is also very sensitive to manufacturing variations, machining tolerances, fluid temperatures, flow forces and various other factors.

It would be desirable to have a valve calibration system and method to calibrate an electrohydraulic valve that has greater stability and repeatability, and that can also be used for pumps with electronically controlled displacement.

SUMMARY

A calibration method is disclosed for an electrohydraulic valve in an electrohydraulic system driven by a pump, where the electrohydraulic valve has an upstream side between the pump and the electrohydraulic valve and a downstream side on the opposite side of the electrohydraulic valve from the pump. A valve control current controls an orifice size through the electrohydraulic valve connecting the upstream side with the downstream side. The calibration method includes opening the electrohydraulic valve, stalling the electrohydraulic system to prevent volume changes in the electrohydraulic system during calibration, closing the electrohydraulic valve with the upstream and downstream sides of the electrohydraulic valve substantially equalized at an equalization pressure, increasing pressure on the upstream side of the electrohydraulic valve to an increased pressure using the pump, and finding a calibration valve control current that provides a calibration orifice size through the electrohydraulic valve by monitoring pressure on the downstream side of the electrohydraulic valve. The increased pressure on the upstream side of the electrohydraulic valve after the valve is closed is greater than the equalization pressure on the downstream side of the valve. The pump can have an electronically controlled displacement.

Finding a calibration valve control current can include initializing a step current to an initial current value, setting the valve control current for the electrohydraulic valve to the step current for a step duration, sensing pressure on the downstream side of the electrohydraulic valve after setting the valve control current to the step current for the step duration, and calculating a step orifice size through the electrohydraulic valve based on the sensed pressure on the downstream side of the electro hydraulic valve. If the calculated step orifice size is less than the calibration orifice size, then increasing the step current by a current increment and repeating the setting, sensing and calculating steps for the increased step current. If the calculated step orifice size is greater than or equal to the calibration orifice size, then using the step current as the calibration valve control current. The electrohydraulic valve is closed when the valve control current equals the initial current value. Calculating a step orifice size based on the sensed pressure on the downstream side of the electrohydraulic valve can include determining a flow rate through the electrohydraulic valve based on the difference in sensed pressure on the downstream side of the electrohydraulic valve before and after setting the valve control current to the step current for the step duration, and determining the step orifice size of the electrohydraulic valve for the step current using the determined flow rate through the electrohydraulic valve and the compressibility of the fluid in the electrohydraulic system.

The electrohydraulic valve can have a valve current control characteristic relating the valve control current to the orifice size through the electrohydraulic valve. The calibration method can also include calculating a table offset for the valve current control characteristic based on the calibration valve control current that provides the calibration orifice size. Calculating a table offset for the valve current control characteristic can include using the valve current control characteristic to determine a table current entry for the valve control current that provides the calibration orifice size, and computing the table offset as the difference between the table current entry and the calibration valve control current. The calibration orifice size can be selected to reduce manufacturing tolerance impacts on the calibration method.

The flow rate through the electrohydraulic valve can be greater than zero for at least one step current before increasing the step current to the calibration valve control current. The calibration method can also include selecting the initial current value and the step duration to maintain a pressure difference between the upstream side and the downstream side of the electrohydraulic valve when the calculated step orifice size is greater than or equal to the calibration orifice size.

Finding a calibration valve control current can include performing a coarse calibration and then performing a finer calibration. Performing a coarse calibration can include starting at an initial coarse current value and using a coarse current increment to find a coarse control current estimate. Performing a finer calibration can include starting at an initial finer current value and using a finer current increment to find the control current estimate. The initial finer current value can be selected based on the coarse control current estimate, and the finer current increment can be less than the coarse current increment. The electrohydraulic valve can be closed when the valve control current equals the initial coarse current value.

Performing a coarse calibration can further include initializing the valve control current to the initial coarse current value, applying the valve control current to the electrohydraulic valve for a coarse step duration, sensing pressure on the downstream side of the electrohydraulic valve after applying the valve control current for the coarse step duration, and calculating a step orifice size through the electrohydraulic valve based on the sensed pressure on the downstream side of the electrohydraulic valve. If the calculated step orifice size is less than the calibration orifice size, then the coarse calibration can also include increasing the valve control current by the coarse current increment and repeating the applying, sensing and calculating steps of the coarse calibration for the increased valve control current. If the calculated step orifice size is greater than or equal to the calibration orifice size, then the coarse calibration can also include setting the coarse control current estimate to the valve control current.

Performing a finer calibration can further include initializing the valve control current to the coarse control current estimate minus a current offset, applying the valve control current to the electrohydraulic valve for a finer step duration, sensing pressure on the downstream side of the electrohydraulic valve after applying the valve control current for the finer step duration, and calculating the step orifice size through the electrohydraulic valve based on the sensed pressure on the downstream side of the electrohydraulic valve. If the calculated step orifice size is less than the calibration orifice size, then the finer calibration can also include increasing the valve control current by the finer current increment and repeating the applying, sensing and calculating steps of the finer calibration for the increased valve control current. If the calculated step orifice size is greater than or equal to the calibration orifice size, then the finer calibration can also include setting the control current estimate to the valve control current.

The coarse current increment can be at least double the finer current increment. After performing the coarse current calibration and before performing the finer current calibration, the calibration method can further include equalizing pressures on the upstream and downstream sides of the electrohydraulic valve at the equalization pressure, closing the valve with the upstream and downstream pressures equalized at the equalization pressure, and increasing pressure on the upstream side of the electrohydraulic valve to the increased pressure using the pump.

An electrohydraulic valve calibration system is disclosed that includes an electrohydraulic valve, a pump, a hydraulic actuator, upstream and downstream pressure sensors and a controller. The electrohydraulic valve has a variable size orifice. The orifice size through the electrohydraulic valve is controlled by a valve control current. Fluid flows through the variable size orifice between an upstream side and a downstream side of the electrohydraulic valve. The pump is on the upstream side of the electrohydraulic valve. The hydraulic actuator is on the downstream side of the electrohydraulic valve. The pump pumps fluid from the upstream side through the electrohydraulic valve to the downstream side. The upstream pressure sensor senses an upstream fluid pressure on the upstream side of the electrohydraulic valve. The downstream pressure sensor senses a downstream fluid pressure on the downstream side of the electrohydraulic valve. The controller opens the electrohydraulic valve, stalls the hydraulic actuator and then closes the electrohydraulic valve with the upstream and downstream fluid pressures at an equalization pressure. The controller then activates the pump to increase the upstream fluid pressure to an increased pressure, and finds a calibration valve control current that provides a calibration orifice size through the electrohydraulic valve by monitoring the downstream fluid pressure. The pump can have an electronically controlled displacement.

The controller can sequentially step through a series of increasing valve control currents until the calibration valve control current is determined. At each step in the series of increasing valve control currents, the controller can sense the downstream fluid pressure and calculate a step orifice size through the electrohydraulic valve based on the sensed downstream pressure. The controller can determine the calibration valve control current based on the valve control current of the step where the calculated step orifice size is greater than or equal to the calibration orifice size. The controller can calculate a flow rate through the electrohydraulic valve based on a change in the sensed downstream fluid pressure before and after each step in the series of increasing valve control currents, and calculate the step orifice size using the calculated flow rate through the electrohydraulic valve and a compressibility of the fluid. A valve current control characteristic relating the valve control current to the orifice size through the electrohydraulic valve can also be used. The controller can calculate a current offset for the valve current control characteristic based on the calibration valve control current and the calibration orifice size. The current offset can be calculated as the difference between a table current entry in the valve current control characteristic for the valve control current that provides the calibration orifice size and the calibration valve control current.

The controller can start at an initial coarse valve control current and sequentially step through a series of increasing valve control currents at a coarse current increment until a coarse valve control current estimate is determined, and then start at an initial finer valve control current and sequentially step through a series of increasing valve control currents at a finer current increment until the calibration valve control current estimate is determined. The finer current increment can be less than the coarse current increment, and the initial finer valve control current can be determined based on the coarse valve control current estimate. At each step in the series of increasing valve control currents, the controller can sense the downstream fluid pressure and calculate a step orifice size through the electrohydraulic valve based on the sensed downstream pressure, and the controller can stop the sequential steps when the calculated step orifice size is greater than or equal to the calibration orifice size.

The above and other features will become apparent from the following description and the attached drawings.

BRIEF DESCRIPTION OF THE DRAWINGS

The detailed description of the drawing refers to the accompanying figures in which.

DETAILED DESCRIPTION

The area of the opening or orifice allowing fluid flow through an electrohydraulic valve is controlled by a valve current. An electrohydraulic valve has a current dependent metering range between a cracking current, which slightly opens the valve orifice, and a saturation current, which fully opens the valve orifice. The valve current control characteristic relating valve current to valve orifice size over the metering range is generally well characterized. Even though the supplier valve current control characteristic is usually accurate in shape, it often needs to be offset to account for variances between valves, for example manufacturing variations, machining tolerances, etc.

Figure 1:
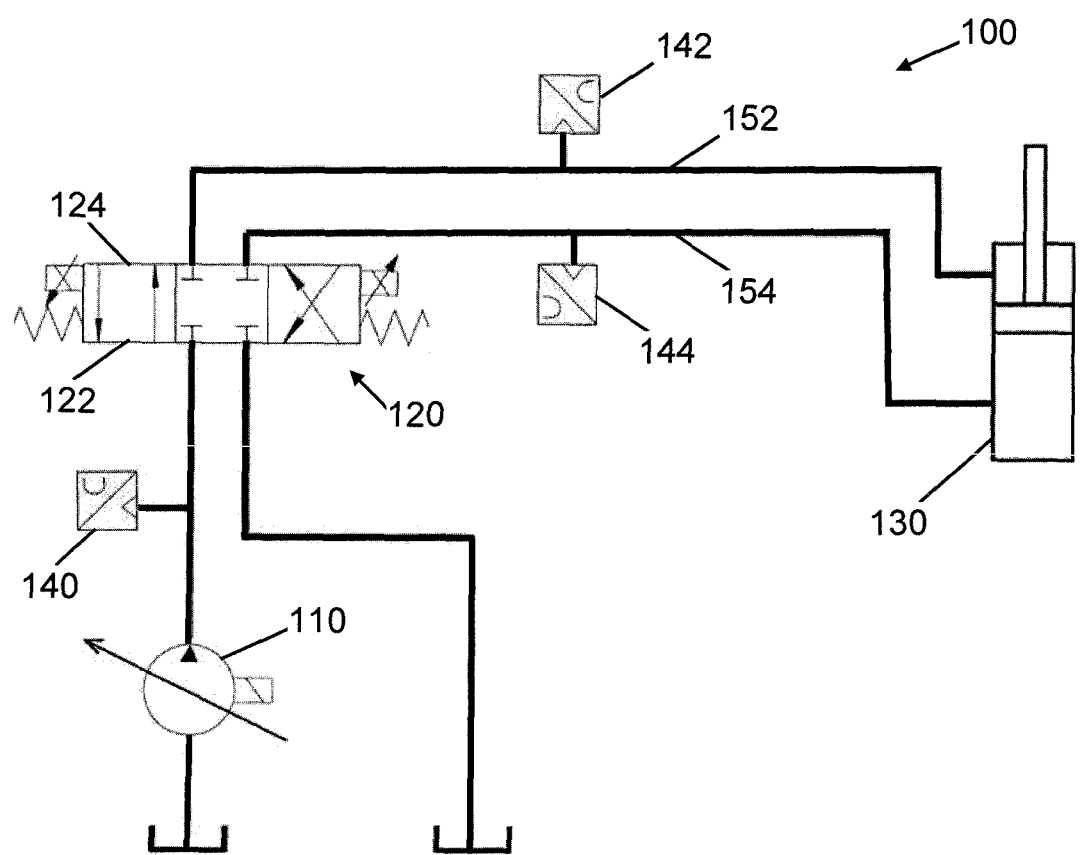
FIG. 1 illustrates an exemplary hydraulic circuit including a pump, a valve, a hydraulic actuator and pressure sensors.

The valve calibration system and method uses certain conditions within the hydraulic system, for example, the fluid pressure on both the upstream and downstream sides of the valve being calibrated, and the fluid temperature. The valve calibration system and method also utilizes the relationship between pressure and volume when fluid is compressed in a stalled circuit, and the relationship between pressure and flow over a known hydraulic orifice. The very small orifice achieved by the cracking current is very sensitive to manufacturing variations, machining tolerances, fluid temperatures, flow forces and various other factors. A somewhat greater valve orifice size and flow value for calibration can be used for greater stability, consistency and repeatability FIG. 1 illustrates an exemplary hydraulic circuit 100 including a pump 110, a valve 120 and a hydraulic actuator 130. The valve 120 has an upstream side 122 closest to the pump 110 and a downstream side 124 closest to the hydraulic actuator 130. The pump 110 pumps fluid to the upstream side 122 of the valve 120 and, when the valve 120 is open the fluid flows through the valve 120 to the hydraulic actuator 130. A return path is also shown from the hydraulic actuator 130 through the valve 120 to a sink. The hydraulic circuit 100 also includes three pressure sensors 140, 142, 144. The first pressure sensor 140 monitors the fluid pressure on the upstream side 122 of the valve 120. The second pressure sensor 142 monitors the fluid pressure on the downstream side 124 of the valve 120 in downstream fluid path 152 that can be pressurized to retract the hydraulic actuator 130. The third pressure sensor 144 monitors the fluid pressure on the downstream side 124 of the valve 120 in downstream fluid path 154 that can be pressurized to extend the hydraulic actuator 130 on the downstream side 124 of the valve 120.

The valve 120 can be calibrated independently for the two fluid paths 152, 154 that it controls. The appropriate pressure sensor 142, 144 corresponding to the fluid path 152, 154 that is being calibrated is used to monitor the fluid pressure on the downstream side 124 of the valve 120. The first pressure sensor 140 monitors the fluid pressure on the upstream side 122 of the valve 120 during calibration for either fluid path 152, 154. The following exemplary calibration procedure will focus on calibration of the valve 120 for the fluid path 152 using the second pressure sensor 142 for monitoring fluid pressure on the downstream side 124. The procedure can also be carried out for calibration of the valve 120 for the fluid path 154 using the third pressure sensor 144 for monitoring fluid pressure on the downstream side 124.

When the fluid pressures on the upstream side 122 and the downstream side 124 of the valve 120 (monitored by pressure sensors 140 and 142, respectively) are known, then the flow through the valve 120 can be calculated for a known orifice size of the valve 120. Additionally, if the hydraulic circuit on the downstream side 124 of the valve 120 is stalled (i.e., no path for fluid to flow, and no potential for volume change), then the additional fluid volume transferred through the valve 120 can be calculated using the following fluid compressibility equation:

$$V_{additional} = \frac{P * V_{initial}}{BulkModulus} \quad (1)$$

where P is the fluid pressure increase on the downstream side 124 of the valve 120, $V_{initial}$ is the initial fluid volume on the downstream side 124 of the valve 120, BulkModulus is a measure of the resistance of the fluid to compression, and $V_{additional}$ is the additional fluid volume transferred through the valve. If observed over a period of time, this fluid volume transfer represents a flow rate as:

$$\frac{V_{additional}}{time} = \frac{P}{time} * \frac{V_{initial}}{BulkModulus} \quad (2)$$
$$= Q$$

where Q is the mass flow through the valve 120.

Mass flow Q can also be calculated using the following orifice equation:

$$Q = CD * A * \sqrt{2 * \frac{\Delta P}{\rho}} \quad (3)$$

where CD is the discharge coefficient, A is the area of the orifice through the valve 120, ΔP is the pressure difference between the upstream and downstream sides of the valve 120, and ρ is the fluid density.

Setting mass flow equations (2) and (3) equal and rearranging terms provides:

$$\frac{P}{time} = \frac{BulkModulus * CD * A * \sqrt{2 * \frac{\Delta P}{\rho}}}{V_{initial}} \quad (4)$$

which relates the fluid pressure increase on the downstream side 124 of the valve 120 to the orifice area of the valve 120. Thus, an orifice size for the valve 120 can be calculated by monitoring the downstream pressure change. Finding a cracking area of the valve 120 enables a determination of the start of flow point if the rest of the valve characteristic is understood.

Figure 2:
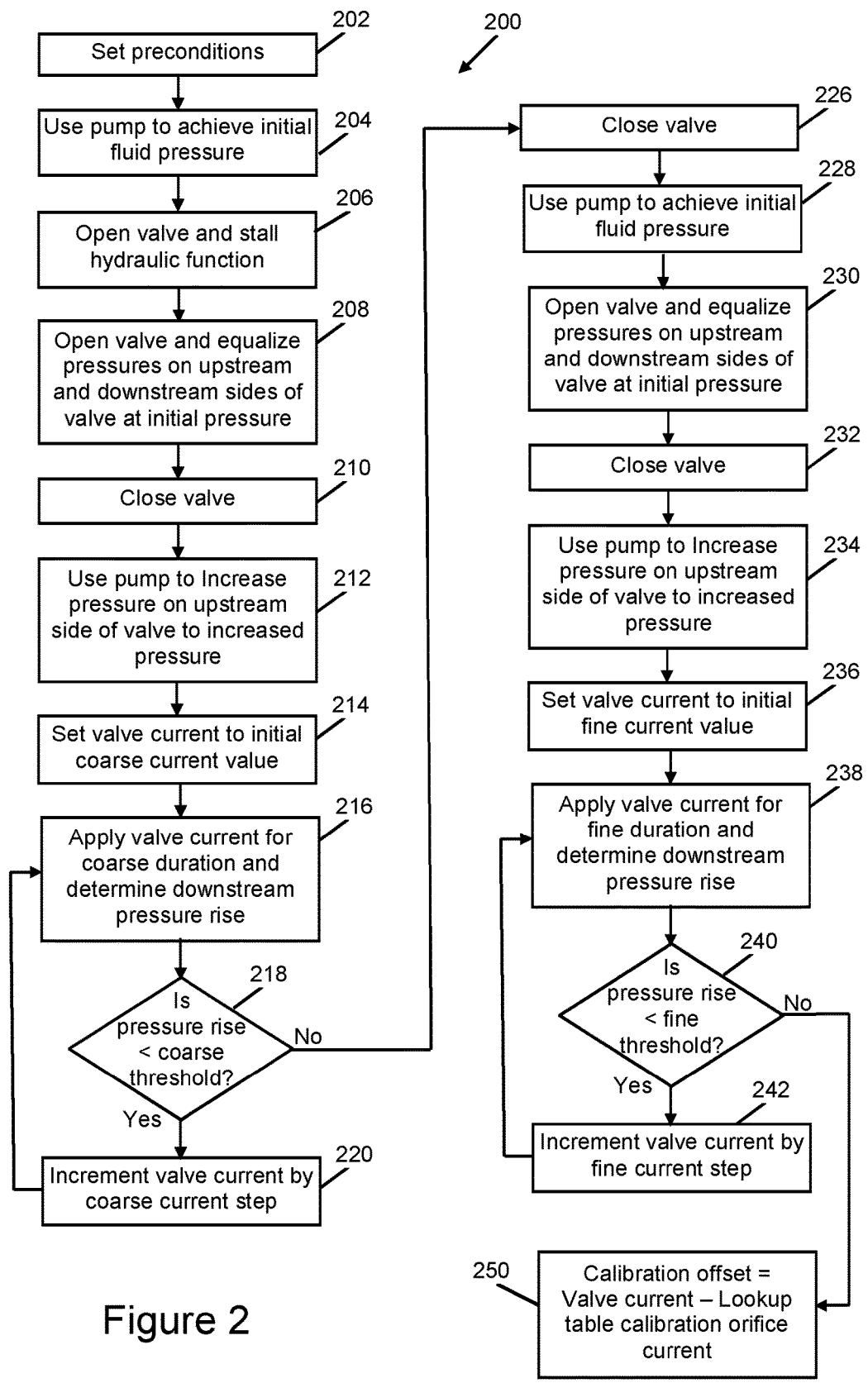
FIG. 2 illustrates an exemplary electrohydraulic valve calibration method.

FIG. 2 illustrates an exemplary electrohydraulic valve calibration method 200 which will be described with reference to the exemplary hydraulic circuit of FIG. 1.

At block 202, calibration preconditions are set which can include, for example, setting a desired performance mode, engine speed, engaging a parking brake of a vehicle, checking hydraulic fluid temperature, etc. At block 204, the hydraulic pressure is set to an initial pressure, for example 20,000 kilopascals (kPa).

At block 206, the hydraulic valve 120 is opened and the hydraulic actuator 130 is stalled so that there is no path for fluid to flow, and no potential for volume change on the downstream side 124 of the valve 120. At block 208, the hydraulic valve 120 is opened and the pressure on both the upstream side 122 and the downstream side 124 of the hydraulic valve 120 are equalized at the initial equalization pressure. Depending on how long the operator holds the lever to stall the hydraulic actuator 130, the pressure equalization of block 208 can be accomplished in block 206, effectively combining blocks 206 and 208 to open the hydraulic valve 120 long enough to stall the hydraulic actuator 130 and equalize the pressures on the upstream and downstream sides 122, 124 of the hydraulic valve 120.

At block 210, the valve 120 is closed with substantially the same equalization pressure on both the upstream side 122 and the downstream side 124 of the hydraulic valve 120. At block 212, with the valve 120 closed, the pressure on the upstream side 122 of the valve 120 is raised to an increased pressure, for example 30,000 kPa, creating a pressure difference between the upstream side 122 and the downstream side 124 of the hydraulic valve 120.

Blocks 214-220 perform a coarse calibration to determine a coarse estimate of the valve current that creates a calibration valve orifice area. At block 214, the valve current is set to an initial coarse current value, for example 250 milliamps (mA). At block 216, the valve current is applied to the valve for a coarse time duration, for example 500 milliseconds (msec) and the change in pressure on the downstream side 124 of the valve 120 is calculated. The pressure change can be calculated as the difference in the pressure reading of the pressure sensor 142 before and after applying the valve current for the coarse time duration. At block 218, it is determined whether the pressure change is less than a pressure change threshold, for example 500 kPa. The pressure change threshold is the pressure change associated with the calibration valve orifice area using equation (4). If the pressure change is less than the pressure change threshold, then at block 220 the valve current is incremented by a coarse current step, for example 10 mA, and the coarse calibration continues back at block 216. If the pressure change is greater than or equal to the pressure change threshold, then the coarse calibration is complete and control goes to block 226.

At block 226, the hydraulic valve 120 is closed. Then at block 228, the pump 110 is activated to bring the pressure on the upstream side 122 of the valve 120 back to the initial fluid pressure. At block 230, the hydraulic valve 120 is opened and the pressures on both the upstream side 122 and the downstream side 124 of the hydraulic valve 120 are equalized at the initial equalization pressure. At block 232, the valve 120 is closed with substantially the same equalization pressure on both the upstream side 122 and the downstream side 124 of the hydraulic valve 120. At block 234, with the valve 120 closed, the pressure on the upstream side 122 of the valve 120 is raised to the increased pressure creating a pressure difference between the upstream side 122 and the downstream side 124 of the hydraulic valve 120.

In an alternative embodiment of the valve calibration procedure, blocks 228-234 can be eliminated. In this alternative embodiment, the finer calibration procedure is started at block 236 right after the coarse calibration is completed at block 218.

Blocks 236-242 perform a finer calibration to determine a finer estimate of the valve current that creates the calibration valve orifice area. At block 236, the valve current is set to an initial fine current value. The initial fine current value can be a function of the final valve current determined in the coarse calibration, for example the initial fine current value can be the final valve current determined in the coarse calibration minus the coarse current step. At block 238, the valve current is applied to the valve for a finer time duration and the change in pressure on the downstream side 124 of the valve 120 is calculated. The finer time duration can be equal to the coarse time duration. The pressure change can be calculated as the difference in the pressure reading of the pressure sensor 142 before and after applying the valve current for the finer time duration. At block 240, it is determined whether the pressure change is less than the pressure change threshold. If the pressure change is less than the pressure change threshold, then at block 242 the valve current is incremented by a finer current step, for example 1 mA, and the finer calibration continues back at block 238. If the pressure change is greater than or equal to the pressure change threshold, then the finer calibration is complete and control goes to block 250.

At block 250, the valve current control characteristic curve or table relating valve current to valve orifice size over the metering range (between the cracking current and the saturation current) is offset by the difference between the valve current in the supplier valve current control characteristic for the calibration valve orifice area and the valve current at the completion of the finer calibration for the calibration valve orifice area.

The exemplary method of FIG. 2 illustrates two calibration procedures, a coarse calibration procedure followed by a finer calibration procedure. The method could use any number of calibration procedures. For example, one calibration procedure can be performed at a desired calibration resolution or step, or multiple calibration procedures can be performed at finer and finer calibration resolutions or steps.

The calibration procedure does not usually stop at the first detected pressure rise (see, for example blocks 216, 238) which would be the cracking current for the valve. The calibration procedure usually proceeds several steps into the metering range of the valve to the calibration valve orifice area that provides a calculated pressure rise on the downstream side of the valve given the time duration the valve current is applied and the pressure difference between the upstream and downstream sides of the valve. The pressure rises on the downstream side of the valve after exceeding the cracking current for the valve can be taken into account when computing the pressure difference on the downstream side of the valve over the time duration. The initial current value and the step duration can be selected to maintain a pressure difference between the upstream side and the downstream side of the electrohydraulic valve during the entire calibration process through when the calculated step orifice size is greater than or equal to the calibration orifice size.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A calibration method for an electrohydraulic valve in an electrohydraulic system including a pump and a hydraulic actuator, the electrohydraulic valve having an upstream side between the pump and the electrohydraulic valve and a downstream side on the opposite side of the electrohydraulic valve from the pump between the hydraulic actuator and the electrohydraulic valve, a valve control current controlling an orifice size through the electrohydraulic valve connecting the upstream side with the downstream side, the calibration method comprising:
   opening the electrohydraulic valve;
   stalling the hydraulic actuator to prevent volume changes in the electrohydraulic system during calibration;
   closing the electrohydraulic valve with the upstream and downstream sides of the electrohydraulic valve substantially equalized at an equalization pressure;
   increasing pressure on the upstream side of the electrohydraulic valve to an increased pressure using the pump, the increased pressure being greater than the equalization pressure on the downstream side of the valve; and
   finding a calibration valve control current that provides a calibration orifice size through the electrohydraulic valve by monitoring pressure on the downstream side of the electrohydraulic valve.

2. The calibration method of claim 1, wherein finding a calibration valve control current comprises:
   initializing a step current to an initial current value, the electrohydraulic valve being closed when the valve control current equals the initial current value;
   setting the valve control current for the electrohydraulic valve to the step current for a step duration;
   sensing pressure on the downstream side of the electrohydraulic valve after setting the valve control current to the step current for the step duration;
   calculating a step orifice size through the electrohydraulic valve based on the sensed pressure on the downstream side of the electrohydraulic valve; and
   if the calculated step orifice size is less than the calibration orifice size, increasing the step current by a current increment and repeating the setting, sensing and calculating steps for the increased step current;
   if the calculated step orifice size is greater than or equal to the calibration orifice size, using the step current as the calibration valve control current.

3. The calibration method of claim 2, wherein calculating a step orifice size based on the sensed pressure on the downstream side of the electrohydraulic valve comprises:
   determining a flow rate through the electrohydraulic valve based on the difference in sensed pressure on the downstream side of the electrohydraulic valve before and after setting the valve control current to the step current for the step duration; and
   determining the step orifice size of the electrohydraulic valve for the step current using the determined flow rate through the electrohydraulic valve and the compressibility of the fluid in the electrohydraulic system.

4. The calibration method of claim 3, wherein the electrohydraulic valve has a valve current control characteristic relating the valve control current to the orifice size through the electrohydraulic valve; and the calibration method further comprising:
   calculating a table offset for the valve current control characteristic based on the calibration valve control current that provides the calibration orifice size.

5. The calibration method of claim 4, wherein calculating a table offset for the valve current control characteristic comprises:
   using the valve current control characteristic to determine a table current entry for the valve control current that provides the calibration orifice size; and
   computing the table offset as the difference between the table current entry and the calibration valve control current.

6. The calibration method of claim 4, wherein the calibration orifice size is selected to reduce manufacturing tolerance impacts on the calibration method.

7. The calibration method of claim 3, wherein the flow rate through the electrohydraulic valve is greater than zero for at least one step current before increasing the step current to the calibration valve control current.

8. The calibration method of claim 3, further comprising:
   selecting the initial current value and the step duration to maintain a pressure difference between the upstream side and the downstream side of the electrohydraulic valve when the calculated step orifice size is greater than or equal to the calibration orifice size.

9. The calibration method of claim 1, wherein finding a calibration valve control current comprises:
   performing a coarse calibration starting at an initial coarse current value and using a coarse current increment to find a coarse control current estimate; and
   performing a finer calibration starting at an initial finer current value and using a finer current increment to find the control current estimate; the initial finer current value being selected based on the coarse control current estimate, and the finer current increment being less than the coarse current increment.

10. The calibration method of claim 9, wherein the electrohydraulic valve is closed when the valve control current equals the initial coarse current value, and performing a coarse calibration comprises:
    initializing the valve control current to the initial coarse current value;
    applying the valve control current to the electrohydraulic valve for a coarse step duration;
    sensing pressure on the downstream side of the electrohydraulic valve after applying the valve control current for the coarse step duration;
    calculating a step orifice size through the electrohydraulic valve based on the sensed pressure on the downstream side of the electrohydraulic valve;
    if the calculated step orifice size is less than the calibration orifice size, increasing the valve control current by the coarse current increment and repeating the applying, sensing and calculating steps of the coarse calibration for the increased valve control current;
    if the calculated step orifice size is greater than or equal to the calibration orifice size, setting the coarse control current estimate to the valve control current; and
    wherein performing a finer calibration comprises:
    initializing the valve control current to the coarse control current estimate minus a current offset;
    applying the valve control current to the electrohydraulic valve for a finer step duration;
    sensing pressure on the downstream side of the electrohydraulic valve after applying the valve control current for the finer step duration;

calculating the step orifice size through the electrohydraulic valve based on the sensed pressure on the downstream side of the electrohydraulic valve;

if the calculated step orifice size is less than the calibration orifice size, increasing the valve control current by the finer current increment and repeating the applying, sensing and calculating steps of the finer calibration for the increased valve control current;

if the calculated step orifice size is greater than or equal to the calibration orifice size, setting the control current estimate to the valve control current.

11. The calibration method of claim 10, wherein the coarse current increment is at least double the finer current increment.

12. The calibration method of claim 9, further comprising, after performing the coarse current calibration and before performing the finer current calibration:

equalizing pressures on the upstream side and the downstream side of the electrohydraulic valve at the equalization pressure;

closing the electrohydraulic valve with the upstream and downstream sides of the electrohydraulic valve substantially equalized at the equalization pressure; and increasing pressure on the upstream side of the electrohydraulic valve to the increased pressure using the pump.

13. The calibration method of claim 1, wherein the pump has an electronically controlled displacement.

14. An electrohydraulic valve calibration system comprising:

an electrohydraulic valve having a variable size orifice, the orifice size through the electrohydraulic valve being controlled by a valve control current; the electrohydraulic valve has an upstream side on one side of the electrohydraulic valve and a downstream side on the opposite side of the electrohydraulic valve; and fluid flows through the variable size orifice between the upstream side and the downstream side of the electrohydraulic valve;

a pump on the upstream side of the electrohydraulic valve;

a hydraulic actuator on the downstream side of the electrohydraulic valve, where the pump pumps a fluid from the upstream side through the electrohydraulic valve to the downstream side;

an upstream pressure sensor for sensing an upstream fluid pressure on the upstream side of the electrohydraulic valve between the electrohydraulic valve and the pump;

a downstream pressure sensor for sensing a downstream fluid pressure on the downstream side of the electrohydraulic valve between the electrohydraulic valve and the hydraulic actuator; and a controller;

wherein the controller opens the electrohydraulic valve, stalls the hydraulic actuator and then closes the electrohydraulic valve with the upstream and downstream fluid pressures at an equalization pressure; the controller then activates the pump to increase the upstream fluid pressure to an increased pressure, and then finds a calibration valve control current that provides a calibration orifice size through the electrohydraulic valve by monitoring the downstream fluid pressure.

15. The electrohydraulic valve calibration system of claim 14, wherein the controller sequentially steps through a series of increasing valve control currents until the calibration valve control current is determined; at each step in the series of increasing valve control currents, the controller receives a signal from the downstream pressure sensor that indicates the downstream fluid pressure and calculates a step orifice size through the electrohydraulic valve based on the sensed downstream fluid pressure; and the controller determines the calibration valve control current based on the valve control current of the step where the calculated step orifice size is greater than or equal to the calibration orifice size.

16. The electrohydraulic valve calibration system of claim 15, wherein the controller calculates a flow rate through the electrohydraulic valve based on a change in the sensed downstream fluid pressure before and after each step in the series of increasing valve control currents, and calculates the step orifice size using the calculated flow rate through the electrohydraulic valve and a compressibility of the fluid.

17. The electrohydraulic valve calibration system of claim 16, further comprising a valve current control characteristic for the electrohydraulic valve, the valve current control characteristic relating the valve control current to the orifice size through the electrohydraulic valve; and wherein the controller calculates a current offset for the valve current control characteristic based on the calibration valve control current and the calibration orifice size.

18. The electrohydraulic valve calibration system of claim 17, wherein the current offset is the difference between a table current entry in the valve current control characteristic for the valve control current that provides the calibration orifice size and the calibration valve control current.

19. The electrohydraulic valve calibration system of claim 14, wherein the controller starts at an initial coarse valve control current and sequentially steps through a series of increasing valve control currents at a coarse current increment until a coarse valve control current estimate is determined, and then starts at an initial finer valve control current and sequentially steps through a series of increasing valve control currents at a finer current increment until the calibration valve control current estimate is determined, the finer current increment being less than the coarse current increment, and the initial finer valve control current being determined based on the coarse valve control current estimate;

wherein at each step in the series of increasing valve control currents, the controller receives a signal from the downstream pressure sensor that indicates the downstream fluid pressure and calculates a step orifice size through the electrohydraulic valve based on the sensed downstream fluid pressure, and the controller stops the sequential steps when the calculated step orifice size is greater than or equal to the calibration orifice size.

20. The calibration system of claim 14, wherein the pump has an electronically controlled displacement.

* * * * *